A. MARR.
TELEPHONIC RECEIVER.
APPLICATION FILED JAN. 8, 1913.

1,087,127.

Patented Feb. 17, 1914.

UNITED STATES PATENT OFFICE.

ALEXANDER MARR, OF MANCHESTER, ENGLAND.

TELEPHONIC RECEIVER.

1,087,127.　　　　　Specification of Letters Patent.　　Patented Feb. 17, 1914.

Application filed January 8, 1913. Serial No. 740,836.

*To all whom it may concern:*

Be it known that I, ALEXANDER MARR, a subject of the King of Great Britain and Ireland, and a resident of Manchester, England, have invented new and useful Improvements in Telephonic Receivers, of which the following is a specification.

In a type of telephonic receiver already known the end of the magnet pole and the rim or the like of the body of the receiver which forms a seat for the diaphragm, are so relatively disposed and arranged that when the diaphragm is laid upon its seat its center is pulled down on to and in contact with the magnet. The diaphragm thus assumes a shallow cupped or dished form. This pulling down or dishing of the diaphragm results in a slight upturning of the periphery of the diaphragm from its seat. When the cap of the instrument is screwed down and reaches the diaphragm, the slightly upturned periphery of the diaphragm is first pressed down by the cap, and this pressing down of the diaphragm periphery results in a flattening of the diaphragm and the elevation of its center from and out of contact with the magnet end. The further movement of the cap results in the opposite faces of the diaphragm adjacent to the periphery being tightly clamped between opposed flat faces on the seat and on the inner face of the cap. The diaphragm, being lifted from the magnet, can vibrate under magnetic variations and undulations but the greatest possible freedom of vibration is not attained because of the described clamping of opposite faces of the diaphragm.

The object of my invention is to so mount the diaphragm and to so form and relatively combine the body of the receiver and the cap that the diaphragm cannot be clamped between oppositely disposed parts of them. When a receiver body, cap, and diaphragm are combined according to my invention for use the diaphragm is only supported on its inner face or face nearer to the magnet by a circular line some distance from its periphery and on its outer face by a concentric circular line of larger diameter. With this arrangement very great freedom of vibration of the diaphragm is permitted and an instrument of very much greater sensitivity is obtained than with a diaphragm the opposed faces of which are oppositely clamped in the usual manner.

The accompanying drawings illustrate various improved forms of diaphragm mounting, the curvature and thickness of the diaphragm and the formation and dimensions of the parts and spaces which insure the diaphragm being properly held being exaggerated to more clearly show this invention.

Figure 1:
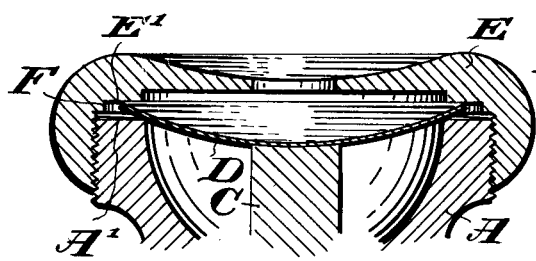
Figure 2:
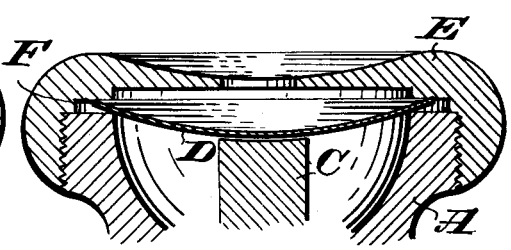
Figure 3:
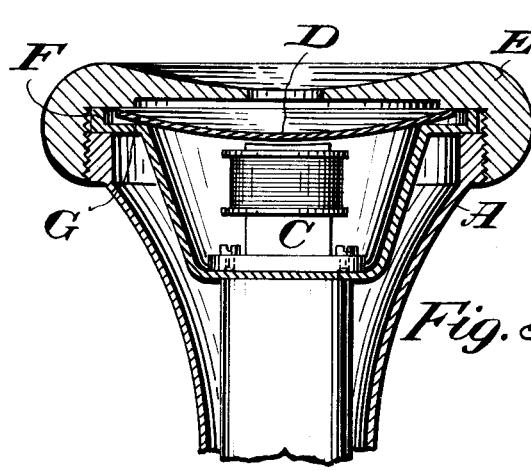
Figure 4:
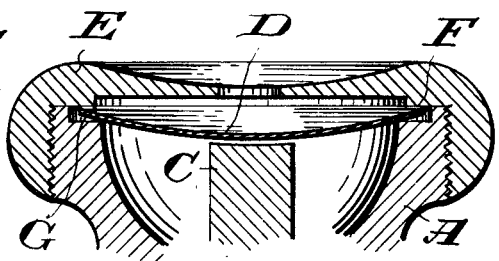

Figure 1 is a sectional view of part of a receiver and its cap and diaphragm, showing the latter pulled down and in contact with the end of the magnet. Fig. 2 is a similar view of the same parts but with the diaphragm lifted out of contact with the magnet and held according to this invention. Figs. 3 and 4 are like sectional views illustrating various modifications in the parts by which the diaphragm is held.

Similar parts are indicated by like letters of reference where they occur in the different drawings.

Referring first to Fig. 1, A represents the body of the receiver which may be formed with the usual seat $A^1$ for the diaphragm B. C is the magnet. When the diaphragm D is laid in place upon the seat $A^1$ the pull of the magnet pulls down the center of the diaphragm until it touches the magnet. Owing to the curvature thus given to the diaphragm its periphery projects upward from the seat $A^1$. When the cap E is screwed in place it reaches the position shown in Fig. 1 without its seat or flat face $E^1$ reaching or exerting any pressure on the periphery of the diaphragm. Upon being screwed farther down than as shown in Fig. 1, the face $E^1$ comes down upon the periphery of the diaphragm and by pressing it downward toward the seat $A^1$ slightly reduces its concavity and lifts the diaphragm away from and free of the magnet as shown in Fig. 2. As soon as this has occurred the shoulder or the like F on the inner face of the cap comes down solidly upon the seat $A^1$ and prevents further downward movement of the cap and prevents the opposed faces of the diaphragm being clamped between the seats $E^1$ and $A^1$. The shoulder F is of such a depth that although it permits the face $E^1$ to come upon the diaphragm and lift it from the magnet, it insures that a recess or space shall be left between the face $E^1$ and the seat $A^1$ which shall be of slightly greater depth than the thickness of the diaphragm. With such an arrangement the under face of the diaphragm is only supported along the sharp line of the inner periphery of the seat A¹ and the upper or outer face is only supported by the sharp edge of the periphery of that face coming against the seat E¹ of the cap. See Fig. 2. In Fig. 3 the same result is shown as being attained by forming a slight recess G in the brass cup of a Western electric type of instrument. This recess is of slightly greater depth than the thickness of the diaphragm and its wall F thus prevents the cap E being screwed down sufficiently far to clamp opposite parts of the diaphragm between itself and the receiver body. Fig. 4 illustrates a like recess G for the reception of a diaphragm turned in the end of a receiver of like type to that shown in Figs. 1 and 2.

What I claim is:—

A telephonic receiver comprising a body, cap and diaphragm, the cap having a shoulder which screws down solidly upon the end of the body, and a recess being left between the adjacent edge portions of the cap and body to receive the edge of the diaphragm, such recess being of slightly greater depth than the thickness of the diaphragm so that when the cap is screwed down home the diaphragm is just "clicked" off the magnet and opposite parts of it are not clamped.

In witness whereof I have hereunto set my hand in the presence of two subscribing witnesses.

ALEXANDER MARR.

Witnesses:
WILLIAM GEO. HEYS,
JOHN O'CONNELL.